United States Patent [19]
Birtalan et al.

[11] Patent Number: 5,865,889
[45] Date of Patent: Feb. 2, 1999

[54] APPARATUS FOR DECORATING THE RIMS OF CAKES AND TARTS

[76] Inventors: Andreas Birtalan; Gabriele Birtalan, both of 16 75180, Pforzheim, Germany

[21] Appl. No.: 775,866

[22] Filed: Jan. 2, 1997

[30] Foreign Application Priority Data

Jan. 3, 1996 [DE] Germany .................. 196 00 057.2

[51] Int. Cl.⁶ .................................................. A21C 15/00
[52] U.S. Cl. .......................... 118/13; 118/14; 118/500; 99/419
[58] Field of Search ................ 118/13, 14, 500; 426/134, 132; 248/127, 146, 151, 371, 346.03; 99/419

[56] References Cited

U.S. PATENT DOCUMENTS

| | | | |
|---|---|---|---|
| 3,100,054 | 8/1963 | Rubens et al. | 220/574 |
| 3,377,943 | 4/1968 | Martin | 99/419 |
| 3,912,249 | 10/1975 | Vaca | 269/54.5 |
| 4,074,656 | 2/1978 | Haapala | 118/502 |
| 5,129,451 | 7/1992 | Moir et al. | 99/419 |
| 5,174,196 | 12/1992 | Cheatham | 99/419 |

FOREIGN PATENT DOCUMENTS

| | | |
|---|---|---|
| 8437532 | 3/1985 | Germany . |
| 1418294 | 10/1973 | United Kingdom . |

*Primary Examiner*—Laura Edwards
*Attorney, Agent, or Firm*—Michael J. Striker

[57] ABSTRACT

The apparatus for decorating a cake or tart(gateau) includes a base plate (1) adapted to accommodate the cake or tart to be decorated; a number of pins (6) distributed over and projecting from a top surface (1*a*) of the base plate (1) and oriented so that they penetrate the cake or tart and extend transversely in relation to cake or tart surfaces to hold the cake or tart on the base plate (1) when the base plate is tilted; and a shaft (8) attached centrally to the base plate (1) having a shaft length (L) such that the base plate (1), when resting with a rim portion thereof and the shaft end (8*a*) on a flat supporting surface (16), is oriented at an angle (£) with respect to vertical such that the center of gravity of the cake or tart (15) and any supporting plate on which it rests is located vertically over the top surface of the base plate (1) so as to hold the cake or tart in a tilted orientation facilitating decoration of its rims.

22 Claims, 2 Drawing Sheets

APPARATUS FOR DECORATING THE RIMS OF CAKES AND TARTS

BACKGROUND OF THE INVENTION

The present invention relates to an apparatus for decorating the rims of cakes and tarts.

A device which is aimed at solving a similar problem has become known from the German Utility Model with the Register Number G 84 37 532. In the device according to this prior publication U-shaped insertion clips are provided for central insertion either from above or from below into the cake or tart body. Because of the thus permitted handling ability, the cake or tart body can be positioned vertically upright and can now be rolled over the decorating material contained in an oblong dish or the like.

In order to make sure that the decorating material will adhere to the rim of the cake or tart when the aforementioned apparatus is used, the latter requires a corresponding previous treatment. Preferably, this is done by applying to the rim a layer of jam, marmalade or whipped cream. This must be done in the conventional way. The rolling motion is likely to affect the layer on which the decorating material is intended to stick. With the aid of this device it is not possible to decorate the rims of cakes and tarts or gateaus, unless the decorating materials are chocolate flakes, chopped nuts, or the like.

SUMMARY OF THE INVENTION

Therefore, it is the object of the present invention to provide an apparatus for decorating the rims of cakes and tarts (gateaus), which permits an individual shaping of the rim decoration to be carried out in an optimum working position.

According to the invention, this object is achieved by an apparatus for decorating rims of cakes and tarts (gateaus) comprising a base plate having a top surface of a size adapted to accommodate the cake or tart to be decorated; a number of pins distributed over the top surface of the base plate and projecting from the top surface, each pin having a pointed free end, the pins being distributed and oriented so that they penetrate the cake or tart to be decorated and extend transversely in relation to cake or tart surfaces; and means for supporting the base plate in a tilted position, so that the top surface is slanted in relation to a flat supporting surface, so as to hold the cake or tart in a tilted orientation facilitating decoration of the rims of the cake or tart.

In particular, the advantages achievable by the present invention reside in that the cake or tart body is detachably fixed on the base plate with the aid of pins so as to permit a slanting or tilted position which allows the rim to be decorated under optimum working conditions.

Various preferred embodiments are possible as claimed in the appended dependent claims.

BRIEF DESCRIPTION OF THE DRAWING

The objects, features and advantages of the invention will now be illustrated in more detail with the aid of the following description of the preferred embodiments, with reference to the accompanying figures, in which.

DESCRIPTION OF THE PREFERRED EMBODIMENTS

Figure 1:
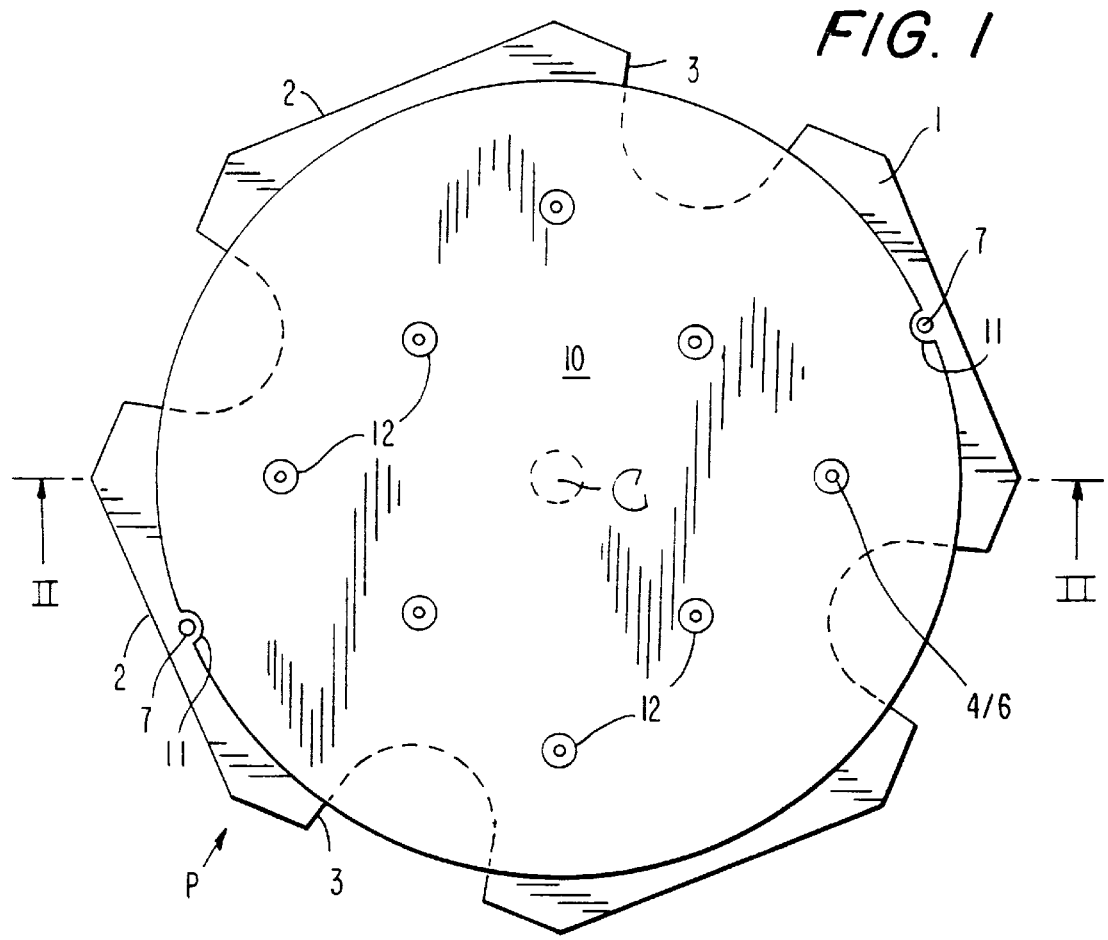
FIG. 1 is a top plan view of an apparatus for decorating rims of cakes and tarts according to the invention.
Figure 2:
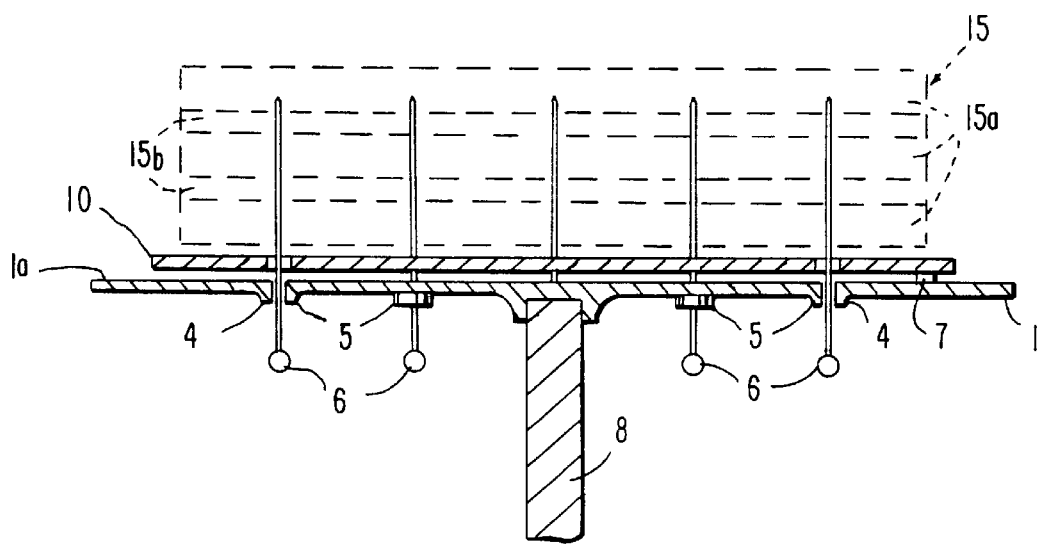
FIG. 2 is a side cross-sectional view of the apparatus shown in FIG. 1 taken along the section line II—II of FIG. 1, with the cake or tart body indicated with dashed lines.

FIG. 1 of the drawings shows one embodiment of an apparatus according to the invention in a top view. This apparatus is designed to facilitate the decorating or piping work on the rims of cake and tart bodies. FIG. 2 shows the inventive apparatus in a section taken on line II—II of FIG. 1. The apparatus comprises a base plate 1 which is mounted on a centrally disposed shaft 8 and which has a top surface 1a. This base plate 1 is shaped like a circular polygon having eight equal sides(equilateral), or eight equal polygonal surfaces 2. Each pair of polygonal surfaces 2 arranged across from each other in the base plate 1 is provided with a radially extending recess 3 in each polygonal surface of that pair which is extends radially from the edge of the base plate 1 towards the center C of the base plate. The radial recesses 3 referred to extend underneath a circular cake plate 10 for supporting the cake or tart to be decorated which has been placed on the base plate 1. The aforementioned cake plate 10 is fixed in position over the top surface 1a by means of bolts 7 attached to the base plate 1 and extending through cutouts 11 provided in edge of the cake plate 10.

Within the area of the cake plate 10 the aforementioned base plate 1 is provided with throughgoing holes 4 for receiving the pins 6. As is evident from FIG. 2, the base plate 1 is provided on its underside with reinforcements 5 in the vicinity of the bore holes 4. The reinforcements 5 hold the pins 6 exchangeably and provide a stable guidance and necessary adherence of the pins 6 within the throughgoing holes 4. Depending on the height of a cake or the composition of a tart(gateau) 15, the exchangeable pins 6 inserted in the throughgoing holes 4 are of different length. As can be seen from the cross-sectional view of FIG. 2, the pins 6, in the exemplified case of a tart(gateau) 15 consist of three baked pastry layers 15a and two layers of fillings 15b disposed therebetween, are just long enough to extend into the top baked pastry layer 15a.

The cake plate 10 fixed in position on the base plate 1 with the aid of the bolts 7 is provided with bore holes 12 which coincide with the throughgoing holes 4 in the base plate 1. The bore holes 12 however, have a somewhat larger diameter than the pins 6, as can be readily recognized from FIGS. 1 and 2.

Figure 3:
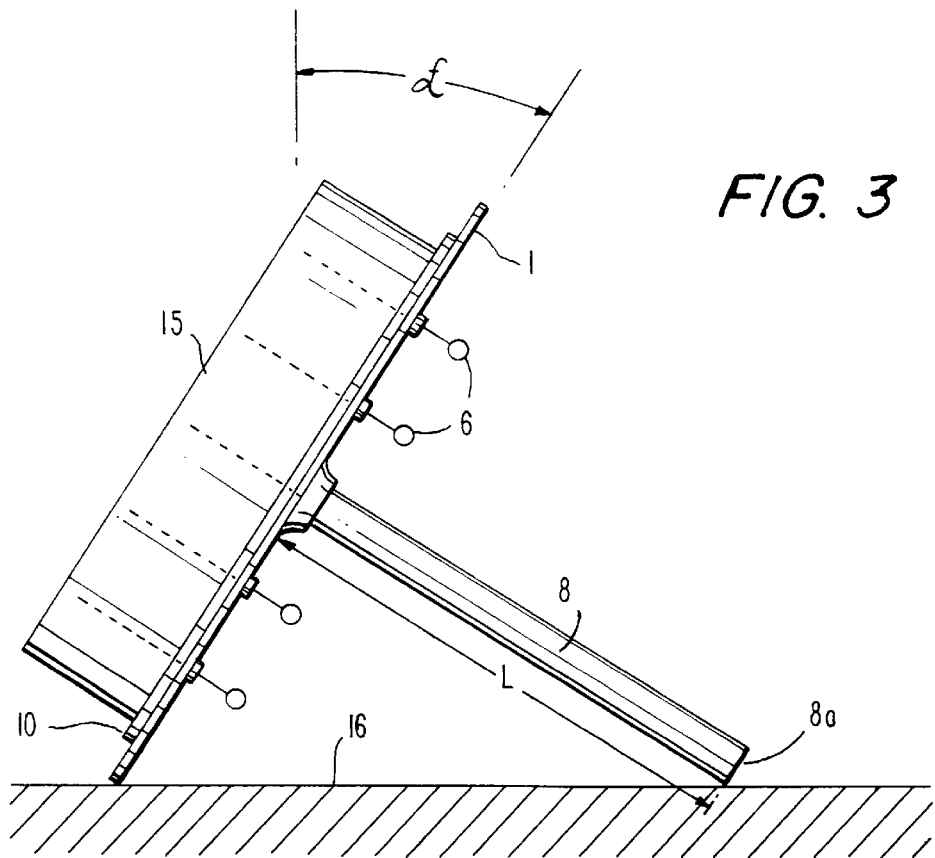
FIG. 3 is a side schematic view of the apparatus shown in FIG. 1 in a working position permitting rim decoration.
Figure 4:
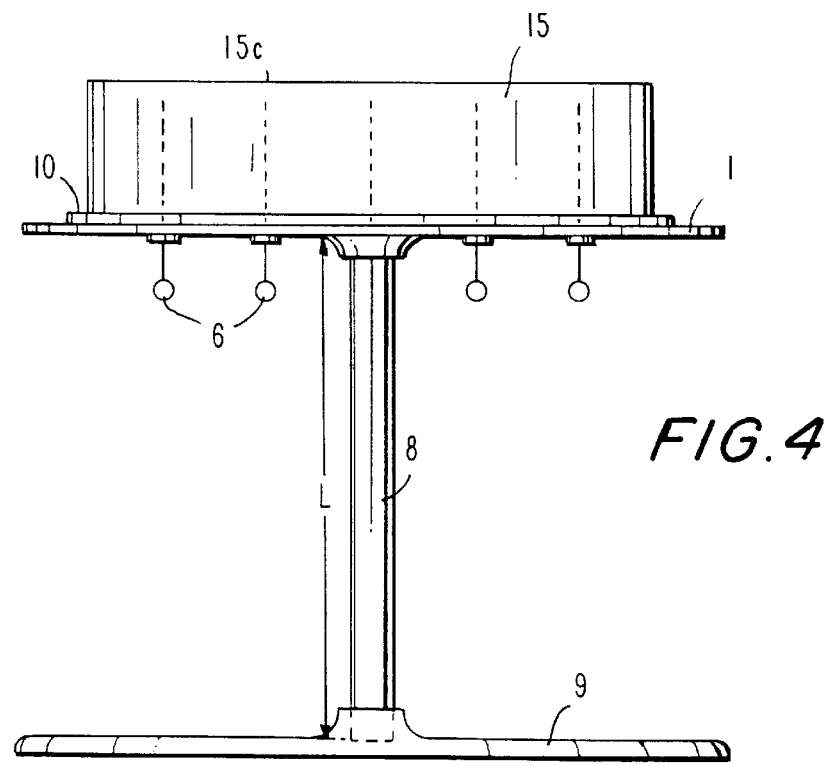
FIG. 4 is a side schematic view of the apparatus as shown in FIG. 1 in another working position permitting decoration of the top side of the cake or tart.

For the purpose of decorating the rim of the tart or gateau, the apparatus as described hereinbefore is placed on a flat plane 16, as can be seen from FIG. 3, with the base plate 1 resting on the flat plane 16 with its rim portion, and the shaft 8 resting on the plane 16 with its shaft end 8a. In this slanted position of the base plate 1 the tart or gateau 15 is firmly retained on the cake plate 10 by the action of the pins 6. Owing to the polygonal surfaces 2 in this embodiment (FIG. 1) the base plate 1 is held in a stable position. Of course, it is likewise readily possible to use a circular base plate 1 instead of a polygonal base. In such a case it is merely necessary to take measures to prevent the plate from rolling away.

The angle of slope £ depends on both the diameter or width of the base plate 1 and the length of the shaft 8. For the purpose of optimizing the working position most suitable for carrying out the decorating work, the angle £ can be chosen to extend over a relatively large range. It is decisive in relation thereto that the center of gravity of the described apparatus including the tart or gateau 15 is always situated within the boundaries of the supporting surface area, i.e. positioned over the tilted base plate.

Upon completion of the rim decoration, the apparatus as shown in FIG. 3 including the tart or gateau 15 is now changed into a standing-up position with the shaft 8 inserted in the support stand 9. When in this standing-up position, the top side 15c of the tart or gateau 15 can be readily decorated. Upon completion of this decorating work the pins 6 are pulled out in the downward direction. Now the tart or gateau 15 together with the cake plate 10 can be lifted off the base plate 1 via the radial recesses 3. By means of a flat, large surface type of cake server the tart or gateau 15 may now be lifted off the cake plate 10.

In another embodiment of the apparatus which is not shown in the drawing, a circular base plate which is without the radial recesses 3 as referred to hereinbefore is used, because a cake plate 10 is not provided. The base plate 1 is provided, in accordance with FIG. 1, with holes 4. In this case the pins are inserted from above into the base plate 1 until meeting against a limiting stop with a force fit. Upon completion of the decorating work as described before, the tart or gateau 15 is lifted off the base by using a large surface and fork type cake server. In cases where the pins 6 are arranged in accordance with the showing of FIG. 1, the cake server is of such design that the spaces between the fork members are in alignment with the rows of pins (direction as indicated by the arrow P). A marking provided for on the rim of the base plate indicates the point of engagement of the cake server.

The pins 6 may have either a circular, triangular, square, star-shaped or knife-like cross-section. The throughgoing holes 4 in the base plate 1 and the bore holes 12 in the cake plate 10 must then be designed accordingly.

While the invention has been illustrated and described as embodied in an apparatus for decorating the rims of cakes and tarts(gateaus), it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus for decorating rims of cakes and tarts, said apparatus comprising a base plate (1) having a top surface (1a) of a size to accommodates one of the cakes and tarts; a number of pins (6) distributed over said top surface (1a) of the base plate (1) and projecting from said top surface (1a), each of said pins (6) having a pointed free end and being oriented so that said pins (6) penetrate the one of the cakes and tarts to be decorated and extend transversely in relation to cake or tart surfaces; a cake plate (10) fixed in position on said base plate (1), and wherein said cake plate (10) has a diameter corresponding to that of a baked bottom of said one of said cakes and tarts to be decorated and said cake plate (10) is provided with a plurality of bore holes (12), each of said bore holes (12) coinciding with one of said throughgoing holes (4) of the base plate (1) so that said pins (6) extend through said bore holes (12) as well as through said throughgoing holes (4); and means for supporting said base plate (1) in a tilted position, so that said top surface (1a) is slanted in relation to a flat supporting surface (16) on which the base plate (1) rests, so as to hold the one of the cakes and tarts being decorated in a tilted orientation facilitating decoration of the rims of said cakes and tarts.

2. An apparatus as defined in claim 1, further comprising means for releasably holding said pins (6) on said base plate (1) so that said pins (6) are exchangeable with other pins of a different length than said pins (6), said other pins being selected so that said different length corresponds to a height of another different one of the cakes and tarts to be decorated.

3. An apparatus as defined in claim 1, wherein said base plate (1) is provided with a plurality of throughgoing holes (4) for receiving said pins (6) and each of said pins (6) is inserted through one of said throughgoing holes (4) so as to project from the top surface (1a) of the base plate (1).

4. An apparatus as defined in claim 1, wherein said base plate (1) is provided with at least one pair of radially extending recesses (3) in an outer circumference of the base plate and each of said recesses of each of said at least one pair are arranged diametrically opposed to each other.

5. An apparatus as defined in claim 1, wherein said means for supporting said base plate (1) in a tilted position comprises a shaft (8) attached centrally to said base plate (1) and having a shaft end (8a) opposite from the base plate (1), said shaft (8) has a shaft length (L) such that the top surface (1a) of said base plate (1), when resting with a rim portion thereof and with the shaft end (8a) on said flat supporting surface (16), is oriented at an angle (£) with respect to vertical such that a center of gravity of the one of the cake and tort (15) to be decorated and any additional bearing device carrying the one of the cakes and tarts to be decorated besides said base plate (1) is located vertically over said top surface (1a) of the base plate (1).

6. An apparatus as defined in claim 1, wherein said throughgoing holes (4) in the base plate (1) for the pins (6) are aligned with spaces between fork members of a large-surface fork-shaped cake server.

7. An apparatus as defined in claim 1, wherein each of said bore holes (12) and said throughgoing holes (4) has a circular transverse cross-section.

8. An apparatus as defined in claim 1, wherein each of said pins (6), said bore holes (12) and said throughgoing holes (4) has a triangular transverse cross-section.

9. An apparatus as defined in claim 1, wherein each of said pins (6), said bore holes (12) and said throughgoing holes (4) has a square-shaped transverse cross-section.

10. An apparatus as defined in claim 1, wherein each of said pins (6), said bore holes (12) and said throughgoing holes (4) has a star-shaped transverse cross-section.

11. An apparatus as defined in claim 1, wherein each of said pins (6), said bore holes (12) and said throughgoing holes (4) has a knife-shaped transverse cross-section.

12. An apparatus as defined in claim 1, wherein said base plate has a greater diameter than said cake plate.

13. An apparatus for decorating rims of cakes and tarts, said apparatus comprising
a base plate (1) having a top surface (1a) of a size to accommodate one of the cakes and tarts to be decorated and provided with a plurality of throughgoing holes (4) distributed over said top surface (1a) of the base plate (1);
a number of pins (6) projecting from said top surface (1a), each of said pins (6) inserted through one of said throughgoing holes (4) and having a pointed free end, wherein said pins are oriented so that said pins (6) penetrate the one of the cakes and tarts to be decorated and extend transversely in relation to cake or tart surfaces; and a shaft (8) attached centrally to said base plate (1) and having a shaft end (8a), said shaft (8) having a shaft length (L) such that said base plate (1), when resting with a rim portion thereof and with the shaft end (8a) on a flat supporting surface (16) is oriented at an angle (£) such that a center of gravity of the one of the cakes and tarts (15) to be decorated and any additional supporting cake plate is located vertically over said top surface of the base plate (1).

14. An apparatus as defined in claim 13, wherein said base plate (1) is provided with at least one pair of radial recesses (3) in an outer circumference of the base plate and each of said recesses of each of said at least one pair are arranged diametrically opposed to each other.

15. An apparatus as defined in claim 14, wherein said base plate (1) is circular except for said recesses.

16. An apparatus as defined in claim 14, wherein said base plate (1) is shaped like an equal-sided polygon.

17. An apparatus for decorating rims of cakes and tarts, said apparatus comprising a base plate (1) having a top surface (1a) of a size to accommodate one of the cakes and tarts; a number of pins (6) distributed over said top surface (1a) of the base plate (1) and projecting from said top surface (1a), each of said pins (6) having a pointed free end and being oriented so that said pins (6) penetrate the one of the cakes and tarts to be decorated and extend transversely in relation to cake or tart surfaces; and means for supporting said base plate (1) in a tilted position, so that said top surface (1a) is slanted in relation to a flat supporting surface (16) on which the base plate (1) rests, so as to hold the one of the cakes and tarts being decorated in a tilted orientation facilitating decoration of the rims of said cakes and tarts; and means for releasably holding said pins (6) on said base plate (1) so that said pins (6) are exchangeable with other pins of a different length than said pins (6), said other pins being selected so that said different length corresponds to a height of another different one of the cakes and tarts to be decorated.

18. An apparatus for decorating rims of cakes and tarts, said apparatus comprising a base plate (1) having a top surface (1a) of a size to accommodate one of the cakes and tarts; a number of pins (6) distributed over said top surface (1a) of the base plate (1) and projecting from said top surface (1a), each of said pins (6) having a pointed free end and being oriented so that said pins (6) penetrate the one of the cakes and tarts to be decorated and extend transversely in relation to cake or tart surfaces; and means for supporting said base plate (1) in a tilted position, so that said top surface (1a) is slanted in relation to a flat supporting surface (16) on which the base plate (1) rests, so as to hold the one of the cakes and tarts being decorated in a tilted orientation facilitating decoration of the rims of said cakes and tarts, said base plate (1) is provided with a plurality of throughgoing holes (4) for receiving said pins (6) and each of said pins (6) is inserted through one of said throughgoing holes (4) so as to project from the top surface (1a) of the base plate (1).

19. An apparatus for decorating rims of cakes and tarts, said apparatus comprising a base plate (1) having a top surface (1a) of a size to accommodate one of the cakes and tarts; a number of pins (6) distributed over said top surface (1a) of the base plate (1) and projecting from said top surface (1a), each of said pins (6) having a pointed free end and being oriented so that said pins (6) penetrate the one of the cakes and tarts to be decorated and extend transversely in relation to cake or tart surfaces; and means for supporting said base plate (1) in a tilted position, so that said top surface (1a) is slanted in relation to a flat supporting surface (16) on which the base plate (1) rests, so as to hold the one of the cakes and tarts being decorated in a tilted orientation facilitating decoration of the rims of said cakes and tarts, said base plate (1) is provided with at least one pair of radially extending recesses (3) in an outer circumference of the base plate and each of said recesses of each of said at least one pair are arranged diametrically opposed to each other.

20. An apparatus for decorating rims of cakes and tarts, said apparatus comprising a base plate (1) having a top surface (1a) of a size to accommodate one of the cakes and tarts; a number of pins (6) distributed over said top surface (1a) of the base plate (1) and projecting from said top surface (1a), each of said pins (6) having a pointed free end and being oriented so that said pins (6) penetrate the one of the cakes and tarts to be decorated and extend transversely in relation to cake or tart surfaces; and means for supporting said base plate (1) in a tilted position, so that said top surface (1a) is slanted in relation to a flat supporting surface (16) on which the base plate (1) rests, so as to hold the one of the cakes and tarts being decorated in a tilted orientation facilitating decoration of the rims of said cakes and tarts, said means for supporting said base plate (1) in a tilted position comprises a shaft (8) attached centrally to said base plate (1) and having a shaft end (8a) opposite from the base plate (1), said shaft (8) has a shaft length (L) such that the top surface (1a) of said base plate (1), when resting with a rim portion thereof and with the shaft end (8a) on said flat supporting surface (16), is oriented at an angle (£) with respect to vertical such that a center of gravity of the one of the cake and tart (15) to be decorated and any additional bearing device carrying the one of the cakes and tarts to be decorated besides said plate (1) is located vertically over said top surface (1a) of the base plate (1).

21. An apparatus as defined in claim 20, wherein said base plate (1) has an equilateral polygonal shape.

22. An apparatus as defined in claim 21, further comprising a support stand (9) for said base plate (1), said support stand (9) including means for receiving and holding said shaft (8).

* * * * *